United States Patent
Novacek et al.

(10) Patent No.: US 6,318,078 B1
(45) Date of Patent: Nov. 20, 2001

(54) FLUID CONTROLLER AND FLUID METER BYPASS ARRANGEMENT

(75) Inventors: William J. Novacek, Bloomington; Aaron W. Smith, Excelsior, both of MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/570,272

(22) Filed: May 12, 2000

(51) Int. Cl.[7] .................................................. F16D 31/02
(52) U.S. Cl. ................................................ 60/384; 60/494
(58) Field of Search ............................. 60/384, 385, 386, 60/387, 494

(56) References Cited

U.S. PATENT DOCUMENTS 3,249,174 * 5/1966 Orwig ...................................... 60/384
4,759,182 * 7/1988 Haarstad ................................. 60/384
5,080,135    1/1992 Stephenson ....................... 137/625.24

* cited by examiner

Primary Examiner—Edward K. Look
Assistant Examiner—Thomas E. Lazo
(74) Attorney, Agent, or Firm—L. J. Kasper

(57) ABSTRACT

A fluid controller (17) to control flow to a steering cylinder (19) is modified to include a selector valve assembly (41,73) having two operating positions. In a first position ("R" in FIG. 1), the selector valve (73) permits fluid flow though the main fluid path (53) in the normal manner, as would be used when the vehicle is in a "roading" mode. In a second position ("W" in FIG. 1 and in FIG. 3), the selector valve (73) blocks flow through the fluid meter (43) which normally provides the follow-up movement (51) to the controller valving (31,33), and bypasses the fluid meter in a "working" mode. Thus, the normal flow rate can be achieved by merely rotating the steering wheel (27) an amount which corresponds to the desired deflection of the controller valving (31,33), without the need for the continuous rotation of the steering wheel, as required during normal steering.

8 Claims, 5 Drawing Sheets

FLUID CONTROLLER AND FLUID METER BYPASS ARRANGEMENT

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fluid controllers of the type used to control the flow of fluid from a source of pressurized fluid to a fluid pressure actuated device, such as a steering cylinder for steering a vehicle. More particularly, the present invention relates to such a fluid controller having at least two different modes of operation, in terms of the relationship between the manual input to the fluid controller and the rate of fluid flow out of the controller.

Although the present invention may be used in connection with fluid controllers of many types, and having various constructions and applications, it is especially advantageous when used in conjunction with a full-fluid-linked steering controller, for use on a vehicle of primarily the "off highway" type, and will be described in connection therewith.

A conventional fluid controller of the type to which the present invention relates includes a housing which defines various fluid ports, and further includes a fluid meter, a valve means defining a main fluid path, and an arrangement for imparting follow-up movement to the valve means, in response to the flow of fluid through the fluid meter. The flow through the controller valve means is directly proportional to the areas of the variable flow control orifices in the main fluid path. As is well know to those skilled in the art, the area of each flow control orifice is, in turn, typically proportional to the rate at which the steering wheel is rotated.

A typical application for a full-fluid-linked steering controller of the type to which the present invention relates would be a vehicle such as is used on a work site, and such a vehicle would be used in one of two operating modes. First, the vehicle may be operated in a "roading" mode, i.e., it is driven on the road, at normal roading speeds, in order to reach a work site. Second, the vehicle may be operated in a "working" mode, at the work site and is performing work related operations, such as moving a pile of dirt, etc., during which the vehicle is moving at relatively slow speeds.

The roading and working modes of operation described above present very different steering requirements, as is now well know to those skilled in the art. When roading the vehicle, a relatively low gain rate would be desirable, whereas, when operating in the working mode, a relatively high gain rate would be desirable. As used herein, the term "gain rate" refers to the rate of change of steered wheel position for a given amount of steering input (such as, but not limited to, rotation of a vehicle steering wheel). With a conventional full-fluid-linked steering controller, however, the gain rate is actually a constant, and as a result, the amount of steering motion by the vehicle operator while roading is typically acceptable, but the amount of steering motion required at the work site, over the course of a typical workday, can cause excessive operator fatigue.

One approach to providing a steering system which gives the operator separate reading and working modes of operation has been to provide the vehicle operator with a steering wheel for use when the vehicle needs to be in the roading mode, and with a joy stick for use when the vehicle needs to be in the working mode. The steering wheel gives the operator somewhat the same feel as driving an automobile, which is desirable for the roading mode, while the joy stick may be used to provide relatively large steering changes with relatively little operator input (a large gain rate), which is desirable for use in the working mode.

Unfortunately, the provision of a steering wheel/joy stick system adds substantially to the overall expense and complication of the system, in terms of the hardware involved, and also results in substantial complication and expense in order to coordinate the portion of the system operated by the steering wheel with the portion of the system operated by the joy stick.

BRIEF SUMMARY OF THE INVENTION

Accordingly, it is an object of the present invention to provide an improved fluid controller for use in a vehicle steering system which can provide both a roading mode and a working mode of operation, but which overcomes the disadvantages of the prior art described above.

It is a more specific object of the present invention to provide such an improved fluid controller which can accomplish the above-stated object, while requiring only a single steering input device, thus overcoming the prior art disadvantage of the need to coordinate between two different steering inputs.

It is still another object of the present invention to provide an improved steering system for a vehicle wherein both the roading mode and the working mode may be accomplished in a single fluid controller, thus overcoming the prior art disadvantage of excessive and complicated hardware.

It is still a further object of the present invention to provide an improved fluid controller for use in a vehicle steering system, which greatly reduces the amount of operator steering motion when operating in the working mode.

The above and other objects of the invention are accomplished by the provision of an improved fluid controller operable to control the flow of fluid from a source of pressurized fluid to a fluid pressure operated device. The controller includes housing means defining an inlet port for connection to the source of fluid, and first and second control fluid ports for connection to the fluid pressure operated device. Controller valve means is disposed in the housing means and defines a neutral position, and at least one operating position in which the housing means and the controller valve means cooperate to define a main fluid path providing fluid communication from the inlet port to the first control fluid port and including a fluid actuated means for imparting follow-up movement to the controller valve means generally proportional to the volume of fluid flow through the main fluid path when the controller valve means is in the operating position. The fluid actuated means includes a rotatable measuring member providing the follow-up movement.

The improved fluid controller is characterized by selector valve means disposed in series flow relationship in the main fluid path, between the fluid inlet port and the fluid actuated means and operable, in a first position to permit normal flow through the main fluid path. The selector valve means is operable in a second position to block fluid flow through the fluid actuated means while bypassing the fluid actuated means, thus permitting flow through the main fluid path, but preventing the follow-up movement to the controller valve means.

DETAILED DESCRIPTION OF THE PREFERRED EMBODIMENT

Figure 1:
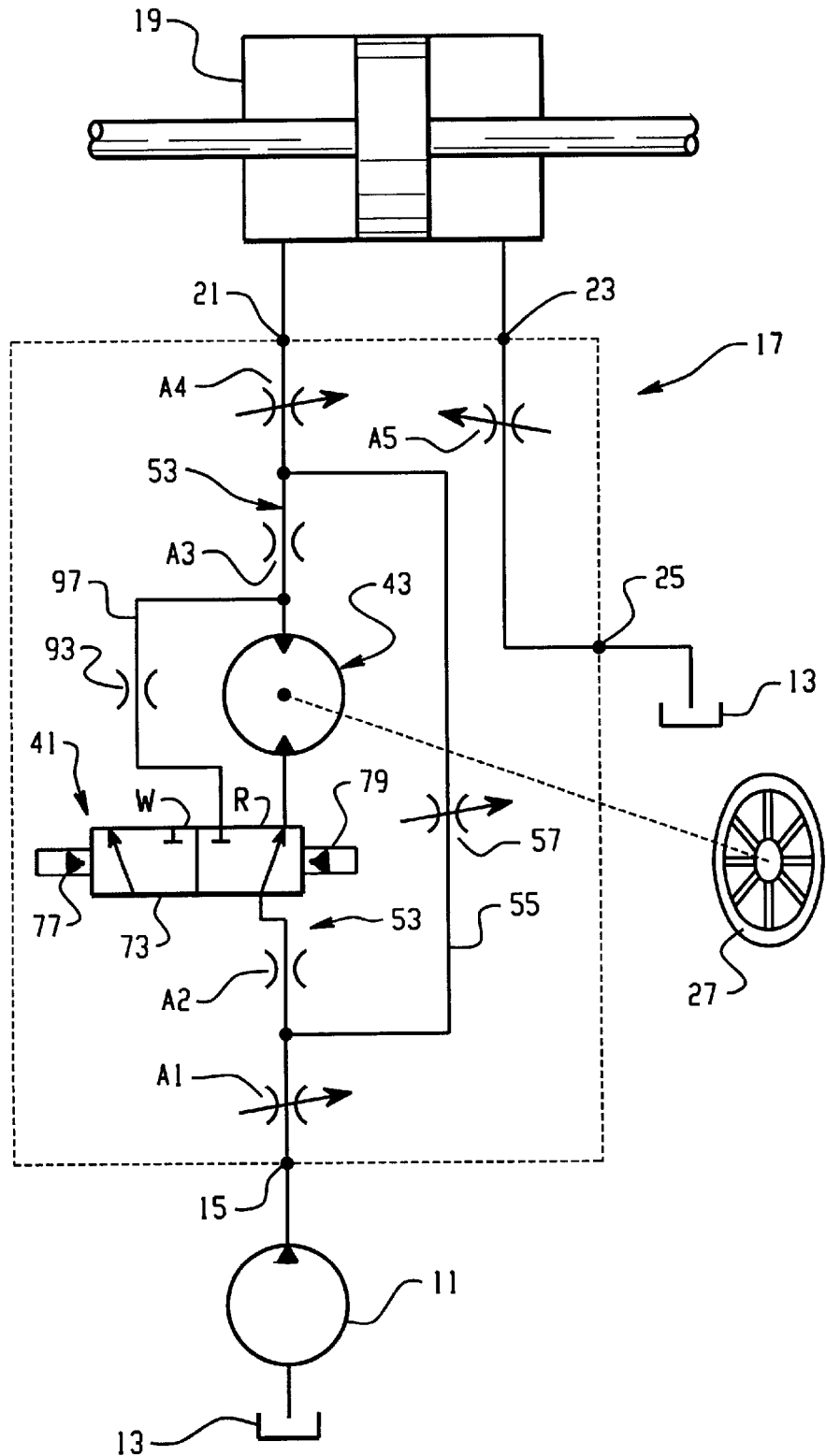
FIG. 1 is a somewhat simplified hydraulic schematic of a hydrostatic power steering system including a fluid controller made in accordance with the present invention.

Referring now to the drawings, which are not intended to limit the invention, FIG. 1 is a somewhat simplified hydraulic schematic of a vehicle hydrostatic power steering system including a fluid controller made in accordance with the teachings of the present invention. The system includes a fluid pump 11, shown herein as a fixed displacement pump, having its inlet connected to a system reservoir 13. The output of the pump 11 is communicated to an inlet port 15 of a fluid controller, generally designated 17.

Referring still to FIG. 1, the fluid controller 17 controls the flow of fluid from the pump 11 to a steering cylinder 19, or some other suitable fluid pressure operated steering actuator or device. The fluid controller 17 includes a pair of control (cylinder) fluid ports 21 and 23 which are connected to the opposite ends of the steering cylinder 19. The fluid controller 17 also includes a return port 25 which returns fluid to the reservoir 13.

The fluid controller 17 is preferably made in accordance with the teachings of U.S. Pat. Nos. 4,759,182 and 5,080,135, both of which are assigned to the assignee of the present invention and incorporated herein by reference. In accordance with one important aspect of the present invention, the fluid controller 17 is operated by means of only a single steering input, shown herein schematically in FIG. 1 as being a conventional steering wheel 27, although it should be understood by those skilled in the art that the invention is not limited to use with a steering wheel, and the steering input device could take various other forms, all of which would be within the scope of the present invention. However, the present invention makes it possible, and it is quite desirable to use only a single steering input device, and avoid the complication and expense of multiple steering input devices.

Figure 2:
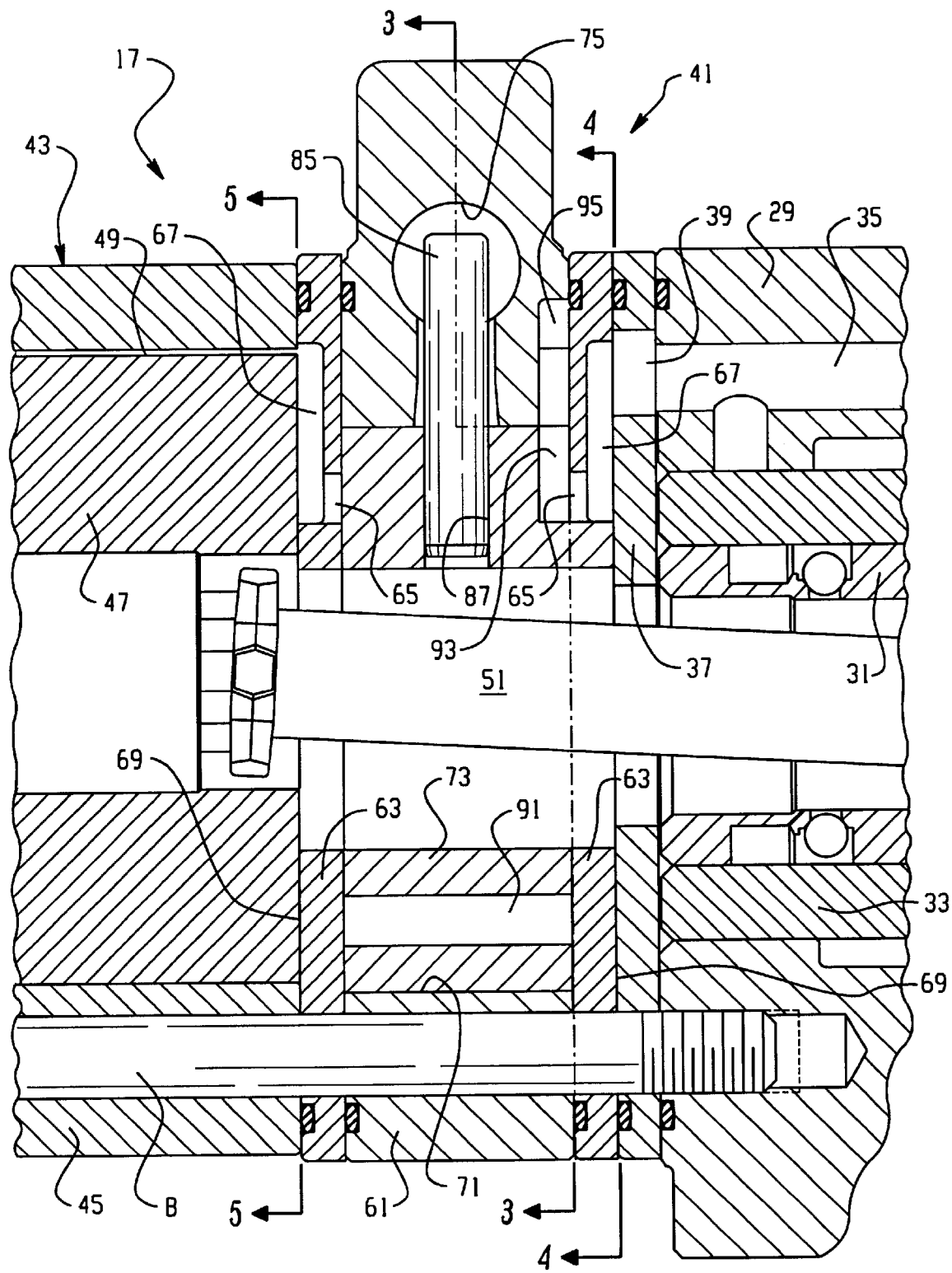
FIG. 2 is a fragmentary, axial cross-section of one portion of the fluid controller shown schematically in FIG. 1.

Referring now to FIG. 2, in conjunction with FIG. 1, the fluid controller 17 includes a valve housing 29, and disposed therein is the controller valving. In the subject embodiment, and by way of example only, the controller valving includes a primary valve member 31, also referred to hereinafter as the "spool valve", and a follow-up valve member 33, also referred to hereinafter as the "sleeve valve". The valve housing 29 defines a plurality of meter passages 35, the function of which is well know to those skilled in the art, but which will be described briefly subsequently. Disposed adjacent the valve housing 29 is port plate 37 which defines a plurality of ports 39, with one port 39 being disposed at the end of, and in open communication with, each of the meter passages 35. Preferably, the spool valve 31 and the sleeve valve 33 incorporate the "wide angle" feature of the above-incorporated U.S. Pat. No. 5,080,135. By wide angle, it is meant that the various flow control orifices defined by the spool valve and sleeve valve do not reach their maximum orifice areas until the relative displacement (deflection) between the spool valve and sleeve valve is on the order of about thirty-five to forty-five or fifty degrees, rather than the ten to twenty degree maximum deflection conventional in many fluid controllers.

Disposed rearwardly of the port plate 37 is a selector valve section, generally designated 41, which will be described in greater detail subsequently. The selector valve section 41 is shown schematically in FIG. 1 as a two-position, three-way, pressure pilot operated flow control valve.

Disposed rearwardly (to the left in FIG. 2) of the selector valve section 41 is a fluid meter, generally designated 43 (also shown schematically in FIG. 1). As is well known in the art, the fluid meter 43 includes an internally toothed ring member 45, and disposed eccentrically within the ring member 45 is an externally toothed star member 47. The internal and external teeth of the ring member 45 and star member 47, respectively, cooperate to define a plurality of expanding and contracting fluid volume chambers 49 (shown best in FIG. 5). As is also well known in the art, as unmetered fluid is communicated to the expanding volume chambers, the star 47 orbits and rotates within the ring 45, and as a result of such orbital and rotational movement, metered fluid is then communicated from the contracting volume chambers. In this way, the fluid meter 43 measures (or "meters") the fluid which flows therethrough, and in addition, provides an output motion (i.e., the orbital and rotational motion of the star 47) which is proportional to the fluid flow through the fluid meter 43.

As is also well know to those skilled in the fluid controller art, the output motion of the star 47 is communicated by means of a drive shaft 51 and is transmitted, in a manner not shown herein, but shown in the above-incorporated patents, into follow-up movement. This follow-up movement is transmitted to the follow-up valve member 33, tending to return the valve member 33 to a neutral position, relative to the primary valve member 31 at the completion of a steering operation. What has been described above is part of the operation when the fluid controller 17 is operating in its normal, roading mode, which occurs when the selector valve section 41 is in the condition, designated "R" shown schematically in FIG. 1.

Figure 3:
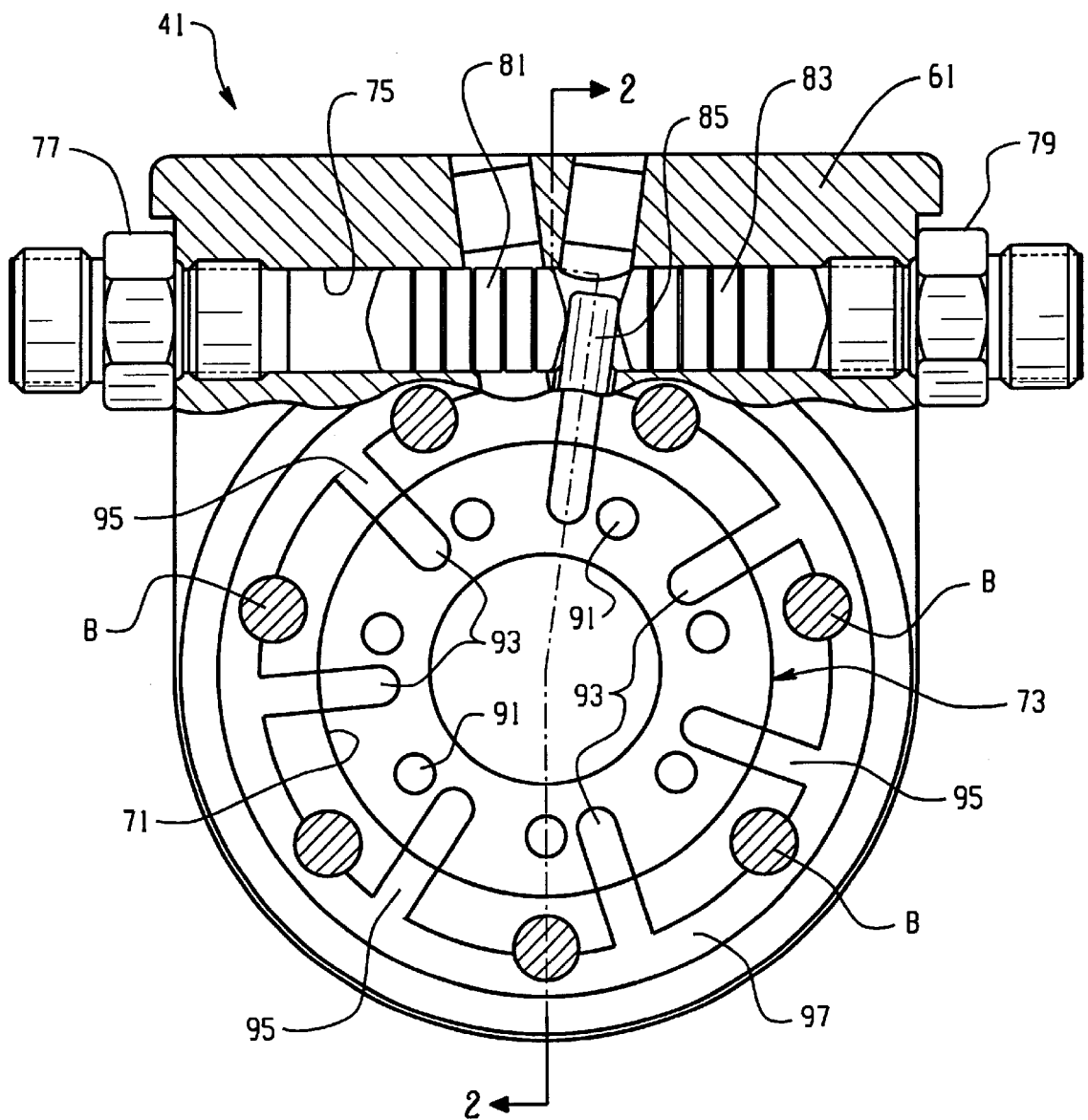
FIG. 3 is a transverse cross-section, taken on line 3—3 of FIG. 2, and on a smaller scale than FIG. 2.
Figure 4:
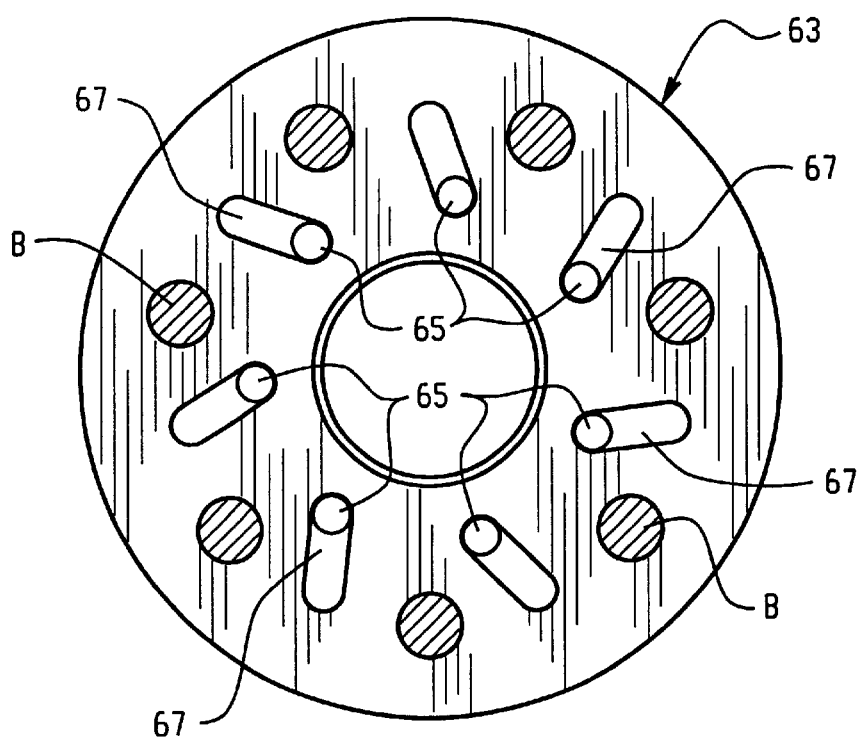
FIG. 4 is a transverse cross-section, taken on line 4—4 of FIG. 2, and on a somewhat smaller scale than FIG. 3.
Figure 5:
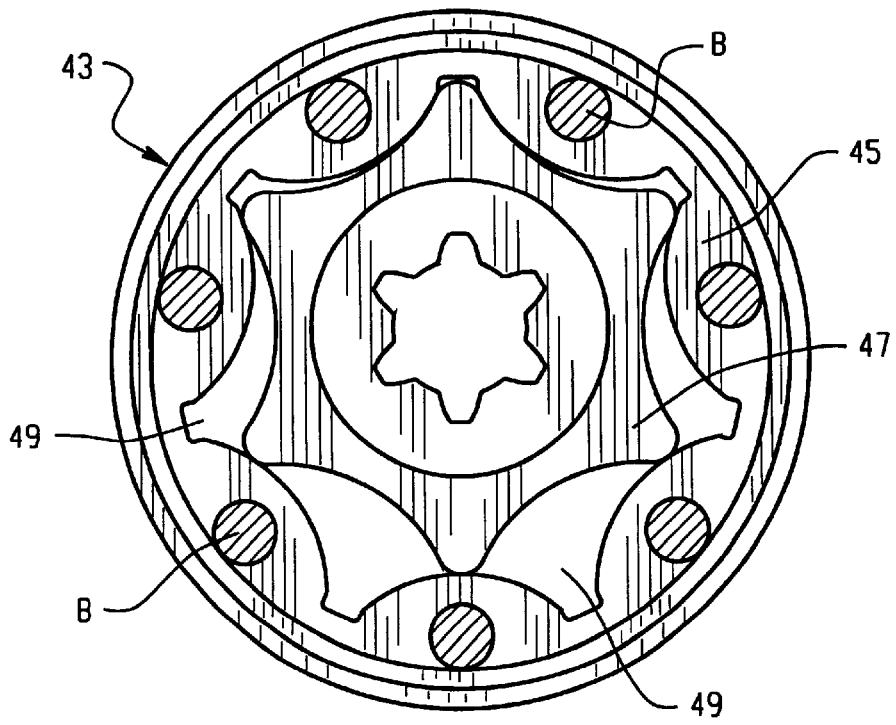
FIG. 5 is a transverse cross-section, taken on line 5—5 of FIG. 2, and on the same scale as FIG. 4.

In a conventional manner, the fluid meter 43 and the selector valve section 41 are held in tight, sealing engagement with the valve housing 29 and port plate 37 by means of a plurality of bolts B, only one of which is shown in FIG. 2, but all of which are shown in transverse cross-section in FIGS. 3, 4, and 5.

Referring again primarily to FIG. 1, when the fluid controller 17 is operating in the normal, roading mode, rotation of the steering wheel 27 by the vehicle operator displaces the spool valve 31, relative to the sleeve valve 33. This displacement of spool valve 31 relative to the sleeve valve 33, opens up a main fluid path, generally designated 53 which provides communication from the inlet port 15 through the fluid meter 43 to the control fluid port 21. The main fluid path 53 includes a series of flow control orifices, and in the subject embodiment, some are fixed orifices, and some are variable orifices (i.e., the flow area through the orifice varies in proportion to the relative displacement of the spool 31 and sleeve 33). These orifices are well know to those skilled in the art, are not in and of themselves essential features of the invention, and therefore will not be described in detail. These flow control orifices are conventionally designated A1; A2; A3; A4; and A5. It should be noted in FIG. 1 that the A5 orifice is not actually part of what has been described as the main fluid path 53, but instead, is part of the return path communicating between the control fluid port 23 on the "return" side of the steering cylinder 19, and the return port 25. Thus, references herein, and in the appended claims, to the "main fluid path" will be understood to mean and include either the path designated "53" in FIG. 1, or the path 53 plus the return path from the port 23 to the return port 25.

In accordance with one important feature of the subject embodiment, the fluid controller 17 is preferably of the type having, in parallel with the main fluid path 53, an amplification fluid path 55, including a variable amplification orifice 57. As is now well know to those skilled in the art, both the amplification fluid path 55 and the variable amplification orifice 57 are defined primarily by the spool valve 31 and the sleeve valve 33, in accordance with the teachings of the above-incorporated U.S. Pat. No. 4,759,182. Although not essential to the present invention, the amplification fluid path 55 communicates with (receives fluid from) the main fluid path 53 just downstream of the main flow control orifice A1, and then again communicates with (flows into) the main fluid path 53 just upstream of the flow control orifice A4. The main purpose of the amplification fluid path 55 is to "amplify" the flow through the fluid meter 43, i.e., communicate a greater total flow to the steering cylinder 19 than the size of the fluid meter 43 would, in and of itself permit.

Referring now primarily to FIGS. 2, 3 and 4, the selector valve section 41 includes a selector valve housing 61, and on either axial end of the housing 61, a spacer plate 63. The spacer plate 63 disposed adjacent the port plate 37 will be referred to hereinafter as the forward spacer plate, while the spacer plate 63 adjacent the fluid meter 43 will be referred to hereinafter as the rearward spacer plate. Preferably, the two spacer plates 63 are substantially identical, thus reducing the total part count of the controller and simplifying assembly thereof. As will be understood by those skilled in the fluid controller art, each of the meter passages 35 and ports 39 would, in a conventional fluid controller, be aligned with the respective fluid volume chamber 49. The selector valve section 41 is interposed between the port plate 37 and the fluid meter 43, both physically and in terms of fluid flow relationship. Therefore, the function of the spacer plates 63 is to "transport" fluid from the meter passages 35 and ports 37 radially inward to the selector valving (to be described subsequently), and then from the selector valving radially outward to the volume chambers 49.

Referring now primarily to FIG. 4, each spacer plate defines a plurality of through bores 65, and communicating with each bore 65 is an angled recess 67, formed in an axial end surface 69 of the spacer plate 63. The forward spacer plate 63 has the radially outer end of each recess 67 in communication with its respective port 39, whereas the rearward spacer plate 63 has the radially outer end of each recess 67 in communication with its respective volume chamber 49.

Referring now primarily to FIG. 3, in which the drive shaft 51 is omitted from the view, the selector valve housing 61 defines a generally cylindrical valve chamber 71, and disposed within the chamber 71 is a rotatable, generally cylindrical selector valve 73. The valving action accomplished by the selector valve 73 will be described subsequently in detail. The selector valve housing 61 also defines a transverse bore 75, the left end of the bore 75 being provided with a fitting 77, and the right end of the bore 75 being provided with a fitting 79. As will be understood by those skilled in the art of hydraulic controls (pilot controls), the fittings 77 and 79 are shown in the schematic of FIG. 1 as the hydraulic means by which the selector valve 73 is piloted or shifted between its two, discrete operating positions shown in FIG. 1 and to be described in greater detail subsequently. Disposed within the transverse bore 75 is a pair of pilot pistons 81 and 83, and disposed axially between the pistons 81 and 83 is a lever member 85 which is received within a bore 87 (see FIG. 2) formed in the selector valve 73.

Thus, when pilot pressure is communicated through the fitting 77, and drained from the fitting 79, the pilot piston 81 shifts to the right to the position shown in FIG. 3. Subsequently, if the pilot pressure in the fitting 77 is drained, and a pilot pressure is communicated through the fitting 79, the pilot piston 83 will be biased from the position shown in FIG. 3, rotating the selector valve 73 counter-clockwise about twenty degrees from the FIG. 3 position.

Referring now primarily to FIGS. 2 and 3, the selector valve 73 defines a plurality of axial bores 91, the number of axial bores 91 being equal to the number of volume chambers 49, and also equal to the number of through bores 65 and recesses 67 in each spacer plate 63. Disposed adjacent each axial bore 91, the forward end surface of the selector valve 73 defines a shallow, radial recess 93. With the selector valve 73 in the rotational position shown in FIG. 3, each recess 93 is in communication with a shallow radial recess 95 formed in a forward axial face of the selector valve housing 61. The radial recesses 95 are each in open communication with an annular chamber 97, the function of which will be described subsequently.

Operation

When the vehicle operator wishes to be able to steer the vehicle in the normal roading mode, it is necessary to direct pilot pressure through the fitting 79, rotating the selector valve 73 from the position shown in FIG. 3 in a counter-clockwise direction such that each axial bore 91 is moved counter-clockwise to the position occupied in FIG. 3 by the radially inner end of the adjacent recess 93. The position of the selector valve 73 just described corresponds to that shown schematically in FIG. 1, and designated "R". By comparing the shifted position of the selector valve 73 described above with FIG. 4, it may be seen that, in the normal, roading mode, each through bore 65 in the forward spacer plate 63 is in communication with its respective axial bore 91. At the same time, each bore 91 is also in communication with its respective through bore 65 in the rearward spacer plate 63.

Thus, with the selector valve 73 shifted from the position shown in FIG. 3 to the normal, roading mode, unmetered fluid is communicated through certain of the meter passages 35, through the axial bores 91 to the expanding volume chambers 49, while at the same time, metered fluid is being communicated from the contracting volume chambers 49 through the respective axial bores 91, and to other of the meter passages 35. It should be understood that in the roading mode, the operation of the fluid controller 17 of the present invention is the same as if the entire selector valve section 41 were removed, and the fluid meter 43 were disposed immediately adjacent the port plate 37.

As is understood by those skilled in the art, in the normal steering mode "R", the deflection angle refers to the displacement between the spool valve 31 and sleeve valve 33 which, in turn, is a function of the rate of rotation of the steering wheel 27. As may best be seen in FIG. 1, in the normal, roading mode of operation, fluid flows through the main fluid path 53 in the same manner as in any conventional fluid controller. At the same time, there is the flow through the amplification flow path 55, such that the total flow to the steering cylinder 19 is the sum of the flows in the flow paths 53 and 55, as is well known already in the fluid controller art.

When the vehicle operator wishes to steer the vehicle in the working mode, it is necessary to communicate pilot pressure through the fitting 77 to rotate the selector valve 73 in a clockwise direction from that described previously, back to the working mode position shown in FIG. 3, i.e., the position designated "W" in FIG. 1. With the selector valve 73 in the working mode position, each of the through bores 65 in the forward spacer plate 63 is in open communication with its respective radial recess 93, and in turn, each recess 93 communicates through its respective radial recess 95 with the annular chamber 97. Note that in FIG. 1, the annular chamber 97 is shown schematically as a bypass path around the fluid meter 43.

With the selector valve 73 in the working mode position "W" of FIG. 3, each axial bore 91 is out of communication with its respective through bores 65 in both the forward and rearward spacer plates 63, such that fluid in the axial bores 91 is simply trapped therein. At the same time, each of the through bores 65 in the rearward spacer plate 63 has flow therethrough blocked by the adjacent axial end surface of the selector valve 73. While the fluid controller is operating in the working mode, fluid in each of the volume chambers 49, as well as fluid in each of the recesses 67 in the rearward spacer plate 63 is trapped. As a result, the star member 47 does not engage in its normal orbital and rotational movement, but instead, is effectively "fluid locked" and remains stationary. Thus, there is no follow-up movement transmitted from the star member 47 by the drive shaft 51 to the follow-up valve member 33.

Figure 6:
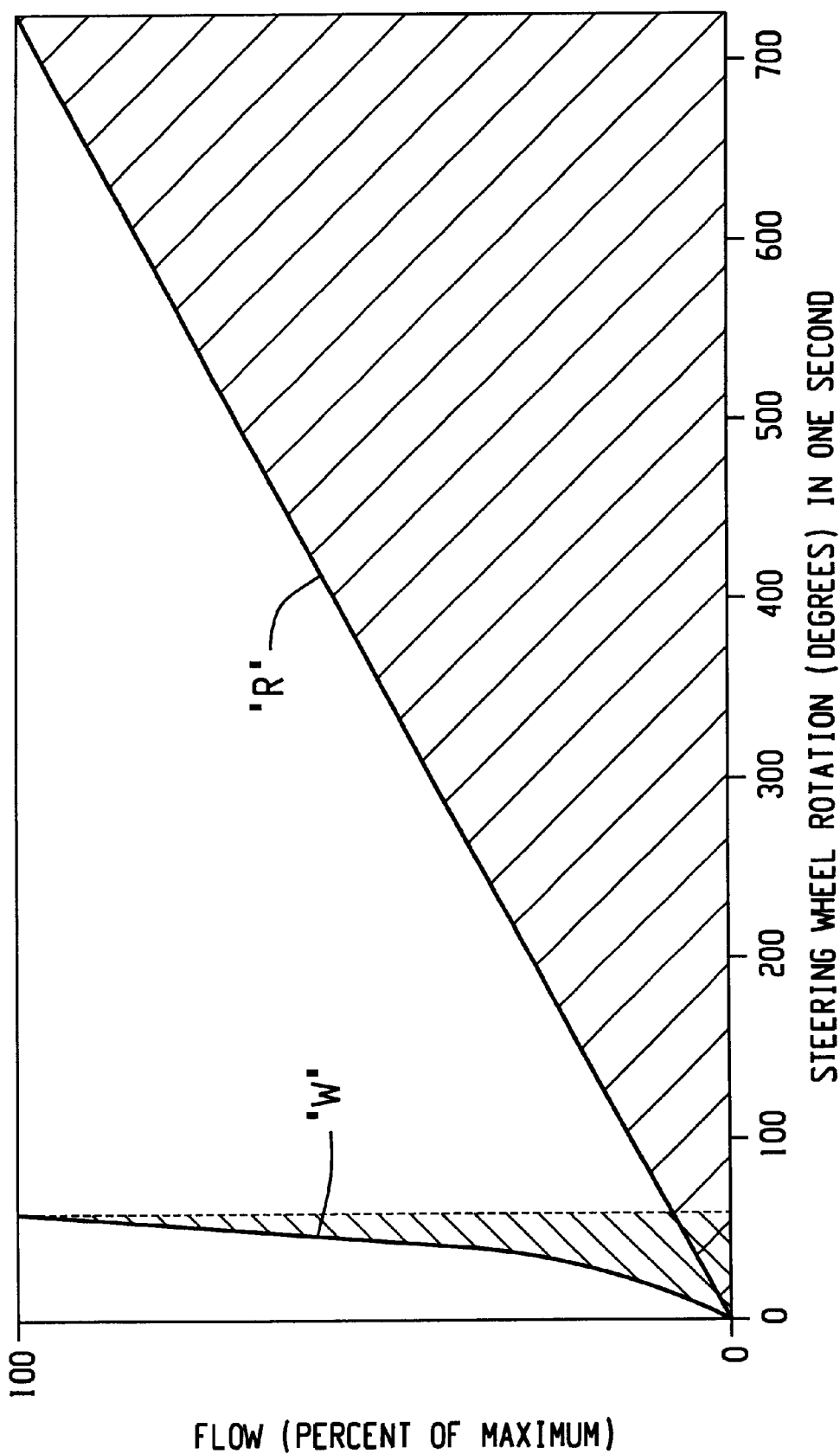
FIG. 6 is a graph of Flow, as a percent of maximum possible flow, versus Steering Wheel Rotation (in degrees) to accomplish the particular flow in one second, comparing the two operating modes of the present invention.

Therefore, when the fluid controller 17 is operating in the working mode "W", the size of each of the flow control orifices A1 through A5 is determined solely by the angle of deflection of the steering wheel 27 from its neutral position. It will be understood by those skilled in the art that the same torque is required to rotate the steering wheel 27 in either mode "R" or "W", but when operating in the working mode, much less movement of the steering wheel is required, as is illustrated in the graph of FIG. 6, because of the absence of any follow-up movement back to the follow-up valve member 33. Instead, the unit operates in the manner of what is known as a "jerk-steer" controller having no fluid meter, in which rotation of the steering wheel merely opens up the valving orifices A1 through A5.

By way of example only, and referring now also to FIG. 6, in the subject embodiment of the invention, when the fluid controller is in the working mode "W", a steering wheel displacement of about 50 degrees results in about the same flow rate (100 percent of maximum possible flow in FIG. 6) to the steering cylinder 19 as occurs when the fluid controller is in the roading mode, and the steering wheel is being rotated at about 120 rpm, to keep the spool valve 31 at the 50 degree deflection, relative to the sleeve valve 33. Thus, with a typical, prior art fluid controller having about four turns (lock-to-lock) capability, the operator must turn the steering wheel two turns (720 degrees) from the centered (neutral) position, and at a high rate of rotation (120 rpm), every time it is desired to make a major steering correction on a work site. However, with the arrangement of the present invention, the operator merely rotates the steering wheel by an angle equal to the desired spool-sleeve deflection (e.g., 50 degrees), and hold the wheel in that position until the desired movement of the steering cylinder 19 has occurred, then releases the steering wheel allowing it to re-center under the influence of the centering springs, shown in the above-incorporated patents.

As will be understood by those skilled in the art, in either mode of operation, the torque required to rotate the steering wheel is the same, because the torque to rotate the wheel is a function of the spring rate of the centering springs. However, with the invention, operation in the working mode "W" requires so much less arm motion by the operator (less rotation of the steering wheel) than was required with the prior art fluid controller (represented by the roading mode "R" in FIG. 6), resulting in much less fatigue for the operator, and enhanced operating efficiency. The decrease in operator effort may best be seen in FIG. 6, which is a graph of Flow (as a percent of maximum flow) versus Steering Wheel Rotation (in degrees) in one second to achieve the corresponding flow. The significance of the graph of FIG. 6 is that it illustrates, pictorially, the decreased operator effort when operating in the working mode "W", as compared to the roading mode "R". In the graph of FIG. 6, the area under each of the graphs is representative of the steering effort required by the operator to achieve the particular flow, in one second.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid controller operable to control the flow of fluid from a source of pressurized fluid to a fluid pressure operated device; said controller including housing means defining an inlet port for connection to said source of fluid, and first and second control fluid ports for connection to said fluid pressure operated device; controller valve means disposed in said housing means and defining a neutral position, and at least one operating position (FIG. 1) in which said housing means and said controller valve means cooperate to define a main fluid path providing fluid communication from said inlet port to said first control fluid port and including a fluid actuated means for imparting follow-up movement to said controller valve means generally proportional to the volume of fluid flow through said main fluid path when said controller valve means is in said operating position, said fluid actuated means including a rotatable measuring member providing said follow-up movement; characterized by:

(a) selector valve means disposed in series flow relationship in said main fluid path, between said fluid inlet port and said fluid actuated means and operable, in a first position ("R" in FIG. 1) to permit normal flow through said main fluid path; and (b) said selector valve means being operable, in a second position ("W" in FIG. 1 and FIGS. 2 and 3) to block fluid flow through said fluid actuated means while bypassing said fluid actuated means, thus permitting flow through said main fluid path while preventing said follow-up movement to said controller valve means.

2. A fluid controller as claimed in claim 1, characterized by said controller valve means comprises a primary, rotatable valve member and a relatively rotatable, follow-up valve member, said controller valve means defining said main fluid path by rotation of said primary valve member, relative to said follow-up valve member.

3. A fluid controller as claimed in claim 2, characterized by said housing means cooperating with said controller valve means to define an amplification fluid path including a variable amplification orifice, said variable amplification orifice being variable, between a minimum flow area and a maximum flow area, in response to rotation of said primary valve member relative to said follow-up valve member.

4. A fluid controller as claimed in claim 3, characterized by said amplification fluid path being in fluid communication with, and receiving fluid from, said main fluid path at a location upstream of said fluid actuated means, and being in fluid communication with, and directing fluid to, said main fluid path at a location downstream of said fluid actuated means.

5. A fluid controller as claimed in claim 1, characterized by said fluid actuated means comprises an internally-toothed ring member and eccentrically disposed therein, an externally-toothed star member comprising said rotatable measuring member.

6. A fluid controller as claimed in claim 1, characterized by said selector valve means being operable, in said second position (FIG. 3) to provide direct, relatively unrestricted fluid communication of said main fluid path, upstream of said fluid actuated means with said main fluid path, downstream of said fluid actuated means.

7. A fluid controller as claimed in claim 5, characterized by said selector valve means being disposed, physically, between said controller valve means and said ring member and said star member of said fluid actuated means.

8. A fluid controller as claimed in claim 1 characterized by said selector valve means comprises a rotatable selector valve including fluid pressure actuated means operable to rotate said selector valve between said first ("R" in FIG. 1) and second ("W" in FIG. 1) positions, in response to a pilot pressure being communicated to a first or a second location in said valve means.

* * * * *